(12) United States Patent
Burke et al.

(10) Patent No.: US 8,667,425 B1
(45) Date of Patent: Mar. 4, 2014

(54) TOUCH-SENSITIVE DEVICE SCRATCH CARD USER INTERFACE

(75) Inventors: David Burke, London (GB); Steven J. Lee, San Francisco, CA (US); David Singleton, London (GB)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 13/249,617

(22) Filed: Sep. 30, 2011

Related U.S. Application Data

(63) Continuation of application No. 12/898,518, filed on Oct. 5, 2010.

(51) Int. Cl.
*G06F 3/033* (2013.01)

(52) U.S. Cl.
USPC .......................................... 715/863

(58) Field of Classification Search
USPC ......... 715/760, 768, 772, 788, 790, 797, 842, 715/863, 866
See application file for complete search history.

(56) References Cited

U.S. PATENT DOCUMENTS

| | | | |
|---|---|---|---|
| 5,359,712 A | 10/1994 | Cohen et al. | |
| 5,463,725 A * | 10/1995 | Henckel et al. | 715/776 |
| 5,640,522 A | 6/1997 | Warrin | |
| 5,782,470 A | 7/1998 | Langan | |
| 5,880,729 A | 3/1999 | Johnston et al. | |
| 6,369,825 B1 | 4/2002 | Nakano | |
| 6,435,500 B2 | 8/2002 | Gumina | |
| 6,575,828 B1 | 6/2003 | NewDelman | |
| 6,628,310 B1 * | 9/2003 | Hiura et al. | 715/776 |
| 6,733,385 B1 | 5/2004 | Enzminger et al. | |
| 7,249,327 B2 * | 7/2007 | Nelson et al. | 715/782 |
| 7,530,893 B2 * | 5/2009 | Thomas | 463/20 |
| 7,661,068 B2 * | 2/2010 | Lund | 715/763 |
| 7,676,767 B2 * | 3/2010 | Hofmeister et al. | 715/863 |
| 8,209,628 B1 * | 6/2012 | Davidson | 715/790 |
| 2006/0017692 A1 * | 1/2006 | Wehrenberg et al. | 345/156 |
| 2006/0085767 A1 * | 4/2006 | Hinckley et al. | 715/863 |
| 2006/0116196 A1 | 6/2006 | Vancura | |
| 2006/0178199 A1 * | 8/2006 | Thomas | 463/20 |
| 2008/0026811 A1 * | 1/2008 | White et al. | 463/17 |
| 2008/0064499 A1 | 3/2008 | Grant et al. | |
| 2008/0132313 A1 | 6/2008 | Rasmussen et al. | |
| 2008/0178126 A1 * | 7/2008 | Beeck et al. | 715/863 |
| 2008/0184173 A1 * | 7/2008 | Sutanto et al. | 715/863 |

(Continued)

OTHER PUBLICATIONS

U.S. Appl. No. 12/898,518, by David Burke, filed Oct. 5, 2010.

(Continued)

*Primary Examiner* — Enrique Iturralde
(74) *Attorney, Agent, or Firm* — Shumaker & Sieffert, P.A.

(57) ABSTRACT

This disclosure is directed to techniques for presenting a scratch-card style interface using a touch-sensitive device. The touch-sensitive device is configured to present a first image using a display of the device. The first image may include a plurality of portions. The plurality of portions may be a plurality of overlapping image particles, or may be a plurality of image layers. The device may detect a first user interaction, and graphically remove a first number of portions of the first image in response to detection of the first user interaction. The device may detect a second user interaction, and graphically remove a second number of portions of the first image in response to the detected second user interaction. Graphical removal of the second number of portions may at least partially reveal a second image presented using the display of the device.

15 Claims, 7 Drawing Sheets

(56) References Cited

U.S. PATENT DOCUMENTS

| | | | |
|---|---|---|---|
| 2009/0007017 A1* | 1/2009 | Anzures et al. | 715/835 |
| 2009/0058822 A1* | 3/2009 | Chaudhri | 345/173 |
| 2009/0278806 A1* | 11/2009 | Duarte et al. | 345/173 |
| 2010/0039446 A1 | 2/2010 | Hillis et al. | |
| 2010/0066751 A1 | 3/2010 | Ryu et al. | |
| 2010/0083190 A1* | 4/2010 | Roberts et al. | 715/863 |
| 2010/0121719 A1 | 5/2010 | Blair et al. | |
| 2010/0137053 A1 | 6/2010 | Blair et al. | |
| 2010/0306693 A1* | 12/2010 | Brinda | 715/784 |
| 2011/0167391 A1* | 7/2011 | Momeyer et al. | 715/863 |
| 2011/0169748 A1* | 7/2011 | Tse et al. | 345/173 |
| 2011/0175821 A1* | 7/2011 | King | 345/173 |
| 2011/0179368 A1* | 7/2011 | King et al. | 715/769 |
| 2011/0185300 A1* | 7/2011 | Hinckley et al. | 715/769 |
| 2011/0185320 A1* | 7/2011 | Hinckley et al. | 715/863 |
| 2011/0191719 A1* | 8/2011 | Hinckley et al. | 715/835 |
| 2011/0256848 A1* | 10/2011 | Bok et al. | 455/411 |
| 2011/0264491 A1* | 10/2011 | Birnbaum et al. | 705/14.4 |
| 2011/0291945 A1* | 12/2011 | Ewing et al. | 345/173 |
| 2011/0302515 A1* | 12/2011 | Kim | 715/768 |

OTHER PUBLICATIONS

Non-Final Office Action from U.S. Appl. No. 12/898,518, dated Mar. 7, 2013, 16 pp.

* cited by examiner

TOUCH-SENSITIVE DEVICE SCRATCH CARD USER INTERFACE

This application is a continuation of U.S. application Ser. No. 12/898,518, filed Oct. 5, 2010, the entire content of which is incorporated herein by reference.

TECHNICAL FIELD

The disclosure relates to improving a user experience when using a touch-sensitive device.

BACKGROUND

Touch-sensitive devices such as smart phones, tablet computers, and the like have become increasingly popular with consumers in recent years. Touch-sensitive devices may utilize device detection of user interaction with a device display, or other device surface, to detect user input. Touch-sensitive devices may enable new mechanisms for the detection of user input. It may be desirable to provide improvements in touch-sensitive device user interaction that mimic real-world objects or actions.

In some examples, lottery, airline, and concert tickets, or other similar merchandising materials may provide a user with an ability to remove physical material that covers printed information to reveal the content of the printed information. For a lottery ticket, for example, a user may scratch off physical material in order to reveal printed material that indicates whether or not the user won a lottery competition.

SUMMARY

This disclosure is directed to simulating a scratch-off style user interface via a touch-sensitive device, e.g., similar to a scratch-off lottery ticket as described above. Presenting a simulated scratch-off user interface as described herein may be desirable for a variety of purposes, some examples of which includes marketing, advertising, or other materials. For example, a lottery game may be presented via a touch-sensitive device utilizing the techniques of this disclosure. In other examples, virtual coupons may be presented using the techniques of this disclosure. These and other examples are also contemplated.

According to one example, an article of manufacture comprising a computer-readable storage medium is described herein. The storage medium stores instructions configured to cause a computing device to present, using a display of a touch-sensitive device, a first image. The instructions configured further cause the computing device to detect, by the touch-sensitive device, a first user interaction the display. The instructions configured further cause the computing device to graphically remove, from the presented first image, a first number of portions of the first image in response to detection of the first user interaction. The instructions configured further cause the computing device to detect, by the touch-sensitive device, a second user interaction with the display. The instructions configured further cause the computing device to graphically remove from the presented first image, a second number of portions of the first image, different than the first number of portions of the first image, in response to detection of the second user interaction. The instructions configured further cause the computing device to. The instructions configured further cause the computing device to. The instructions configured further cause the computing device to present, using the display, at least part of a second image that is revealed in response to the graphical removal of the second number of portions of the first image.

According to another example, a method is described herein. The method includes presenting a first image using a display of a touch-sensitive device. The method further includes detecting, by the touch-sensitive device, a first user interaction with the display. The method further includes graphically removing, by the touch-sensitive device, a first number of portions of the first image responsive to detecting the first user interaction. The method further includes detecting, by the touch-sensitive device, a second user interaction with the display. The method further includes graphically removing, by the touch-sensitive device, a second number of portions of the first image, different than the first number of portions of the first image, responsive to detecting the second user interaction. The method further includes. The method further includes presenting, using the display of the touch-sensitive device, at least part of a second image that is revealed for display to a user in response to the removal of the second number of portions of the first image.

According to another example, a touch-sensitive device is described herein. The device includes a display control module configured to present, using a display of a touch-sensitive device, a first image. The device further includes a sensor control module configured to detect a first user interaction with the display. The device further includes means for graphically removing a first number of portions of the first image from the presented first image in response to detection of the first user interaction. The sensor control module is further configured to detect a second user interaction with the display. The means for graphically removing a first number of portions from the presented first image, are further for removing a second number of portions of the first image, different than the first number of portions of the first image, from the first image in response to detection of the second user interaction. The display control module is configured to present, using the display, at least part of a second image revealed in response to the graphical removal of the second number of portions of the first image.

The details of one or more embodiments of the disclosure are set forth in the accompanying drawings and the description below. Other features, objects, and advantages of the disclosure will be apparent from the description and drawings, and from the claims.

DETAILED DESCRIPTION

Figure 1A:
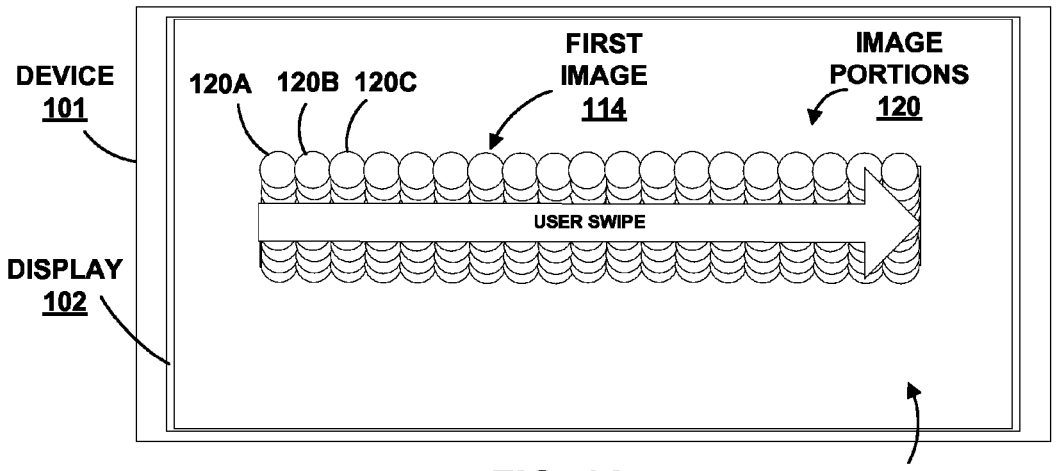
FIGS. 1A-1C are conceptual diagrams that illustrate one example of a touch-sensitive device operated consistent with the techniques of this disclosure.
Figure 1B:
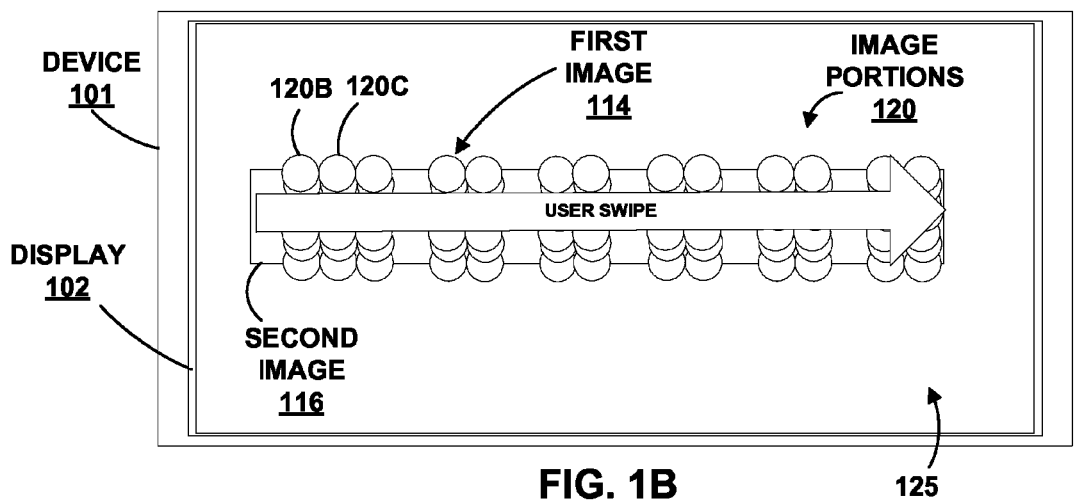
Figure 1C:
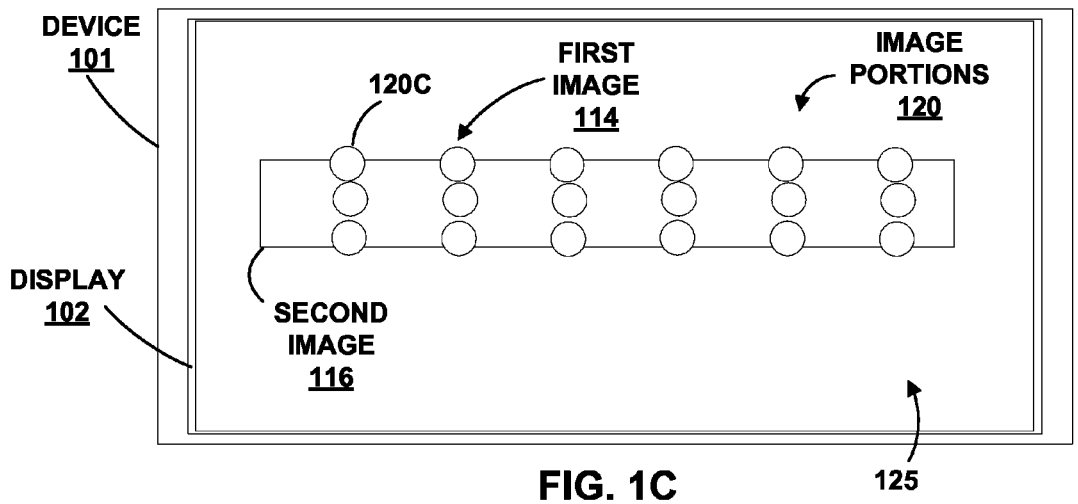

FIGS. 1A-1C are conceptual diagrams that illustrate one example of a touch-sensitive device 101 operated according to one or more of the techniques of this disclosure. FIGS. 1A-1C depict three examples of screens presented by a display 102 of touch-sensitive device 101. The respective screens depicted in FIGS. 1A-1C may be presented in response to device 101 detection of user touch, e.g., device 101 detection that a user has interacted with, (performed a gesture with a finger or stylus at or near), a display 102 of touch sensitive device 101. In other examples, the respective screens depicted in FIGS. 1A-1C may be presented in response to device 101 detection of other user input, for example device detection that a user has brought a finger or stylus in contact with a non-display surface of device 101, e.g., a back or side surface of device 101.

As shown in FIG. 1A, device 101 may present a first image 114 using display 102. First image 114 may include a plurality of image portions 120A, 120B, and 120C (collectively image portions 120). The plurality of image portions 120 may be referred to as image "particles." The image particles may be arranged to substantially "cover" a second image (e.g., image 116 shown in FIG. 1B). At least some of the image particles may be arranged to overlap one another, such that a second image 116 is substantially covered by the first image 114. According to the techniques of this disclosure, presentation of first image 114 may be graphically removable, e.g., based on device 101 detection of user touch, to present content of second image 116. In one example, second image 116 may be text. In other examples, second image 116 may be a still image, a video, a link, or a user-selectable icon. In one example, removal of image portions 120 may include removal of image portions 120 from presentation using display 102 entirely. In another example, image portions 120 may be removed from first image 114, and remain presented using display 102 at another region (e.g., region 125 as shown in FIGS. 1A-1C) of display 102.

Device 101 may detect user interaction with device 101, e.g., a user "swipe" at or near a region of display 102 where first image 114 is presented as shown in the example of FIG. 1A. FIG. 1B depicts device 101 response to detection of a user gesture as shown in FIG. 1A. As shown in FIG. 1B, at least some of image portions 120 have been removed from first image 114. For example, image portion 120A of first image 114 is no longer presented by display 102. Removal of at least some of image portions 120 may reveal at least part of second image 116 to a user. Removal of at least some of image portions 120 may also or instead reveal other image portions 120 of first image 114.

As also shown in FIG. 1B, device 101 may detect a second user interaction with device 101, e.g., a second user swipe at or near display 102. As shown in FIG. 1C, in response to the detected second user interaction shown in FIG. 1B, device 101 may remove at least some of image portions 120 from presentation by display 102. For example, image portion 120B of first image 114 is no longer presented by display 102.

The at least some image portions 120 of second image 116 removed as shown in FIG. 1B may be considered a first number of image portions 120. As shown in FIG. 1C, the second user swipe depicted in FIG. 1B may cause device 101 to remove presentation of a second number of image portions 120 different than the first number of image portions.

As shown in FIG. 1C, at least part of second image 116 may be revealed in response to removal of the second number of image portions 120 of the first image 114. Although not depicted in FIGS. 1A-1C, in some examples a third user swipe may be detected by device 101. In response, device 101 may cause at least some of the image portions 120 depicted in FIG. 1C to be removed from presentation by device 101. In some examples, device 101 may detect one or more additional user interactions with device 101, and correspondingly remove one or more image portions 120. Eventually, device 101 may remove all portions 120 of second image 116 entirely. According to some examples, removal of all of second image 116 may enable a user to view, select, or otherwise interact with second image 116. In other examples, a user may interact with second image 116 while portions 120 of first image 114 remain presented by display 102.

As described above, device 101 may remove presentation of image portions 120 in response to detection of user interaction with device 101 (e.g., one or more user gestures at or near device 101 display 102). Device 101 may remove a different number of image portions 120 with each successive detected user interaction. In some examples, device 101 may remove presentation of image portions 120 according to a step function. For example, a first detected user interaction may cause device 101 to remove a first number of image portions 120 of first image 114, while a second detected user interaction may cause device 101 to remove a second, greater number of image portions 120 of first image 114. A third user gesture may cause device 101 to remove a third number of image portions 120 greater than the first and second numbers of image portions 120. Device 101 may continue to detect user interaction until all or most of image portions 120 of first image 114 have been removed from first image 114, thereby revealing second image 116.

In another example, device 101 may remove presentation of image portions 120 according to a reverse step function. For example, a first detected user interaction may cause device 101 to remove a first number of image portions 120 of first image 114, while a second detected user interaction may cause device 101 to remove a second, lesser number of image portions 120 of first image 114. A third user gesture may cause device 101 to remove a third number of image portions 120 less than the first and second numbers of image portions 120. Device 101 may continue to detect user interaction until all or most of image portions 120 of first image 114 have been removed from first image 114, thereby revealing second image 116.

FIGS. 1A-1C are provided for exemplary purposes, and are intended to be non-limiting. For example, FIGS. 1A-1C depict image portions 120 removed in response to respective user interactions with device 101 uniformly across presentation of first image 114, i.e., in the example of FIG. 1B, a third of image portions 120 have been removed with respect to first image 114 depicted in FIG. 1A. Similarly, in FIG. 1C, a third of image portions 120 of first image 114 have been removed with respect to first image 114 depicted in FIG. 1B. In other examples, image portions 120 removed in response to detected user interaction with device 101 may not be removed from presentation uniformly, meaning that more image portions 120 may be removed from a right side of image 114 than a left side of image 114, or from a top section of image 114 than a bottom section of image 114 in response to detected user interaction with device 101. In addition, for illustrative purposes, the plurality of image portions 120 depicted in FIGS. 1A-1C are presented of uniform size and shape. In other examples, the plurality of image portions 120 may have different sizes, shapes, colors, or other characteristics. For example, some image portions may be circular, while others are oval, and/or still others are rectangular or square shaped.

In other examples not depicted in FIG. 1, device 101 may be configured to remove image portions 120 of first image 114 based on device 101 detection of an amount of pressure applied by a user when interacting with device 101 (e.g., device display 102). For example, a device as described herein may be configured to detect how forcefully a user has interacted with, e.g., performed a user gesture such as a swipe, at a surface of device 102. In one example, device 101 may include one or more piezoelectric actuators at or near display that are configured to detect how hard a user has pressed display 102, or another surface of device 101. In another example, device 101 may be configured to differentiate between different pressures by detecting a surface area of a user's finger in contact with display (e.g., a lighter press or touch may cause less surface area in contact with display than a harder press or touch). According to these examples, device 101 may be configured to remove relatively more image portions from presentation by display 102 when device 101 has detected that the user has interacted with device 101 with more pressure or force (e.g., a user has performed a swipe on display 102 pressing his/her finger down harder).

The techniques of this disclosure may provide for an improved user experience when using a touch-sensitive device 101. By presenting a first image 114 that covers a second image 116 as a plurality of image portions 120, and respectively removing a different number of image portions 120 in response to detection of successive user swipes as depicted in FIGS. 1A-1C, simulation of a scratch-off user interface using a touch-sensitive device may appear more life-like and realistic to a user. Furthermore, by removing from presentation a different number of image portions 120 based on a relative amount of pressure or force detected for a user interaction with device 101, simulation of a scratch-off user interface may more greatly reflect a real-life user experience when using a scratch-off card, e.g., a scratch-off lottery ticket.

Figure 2:
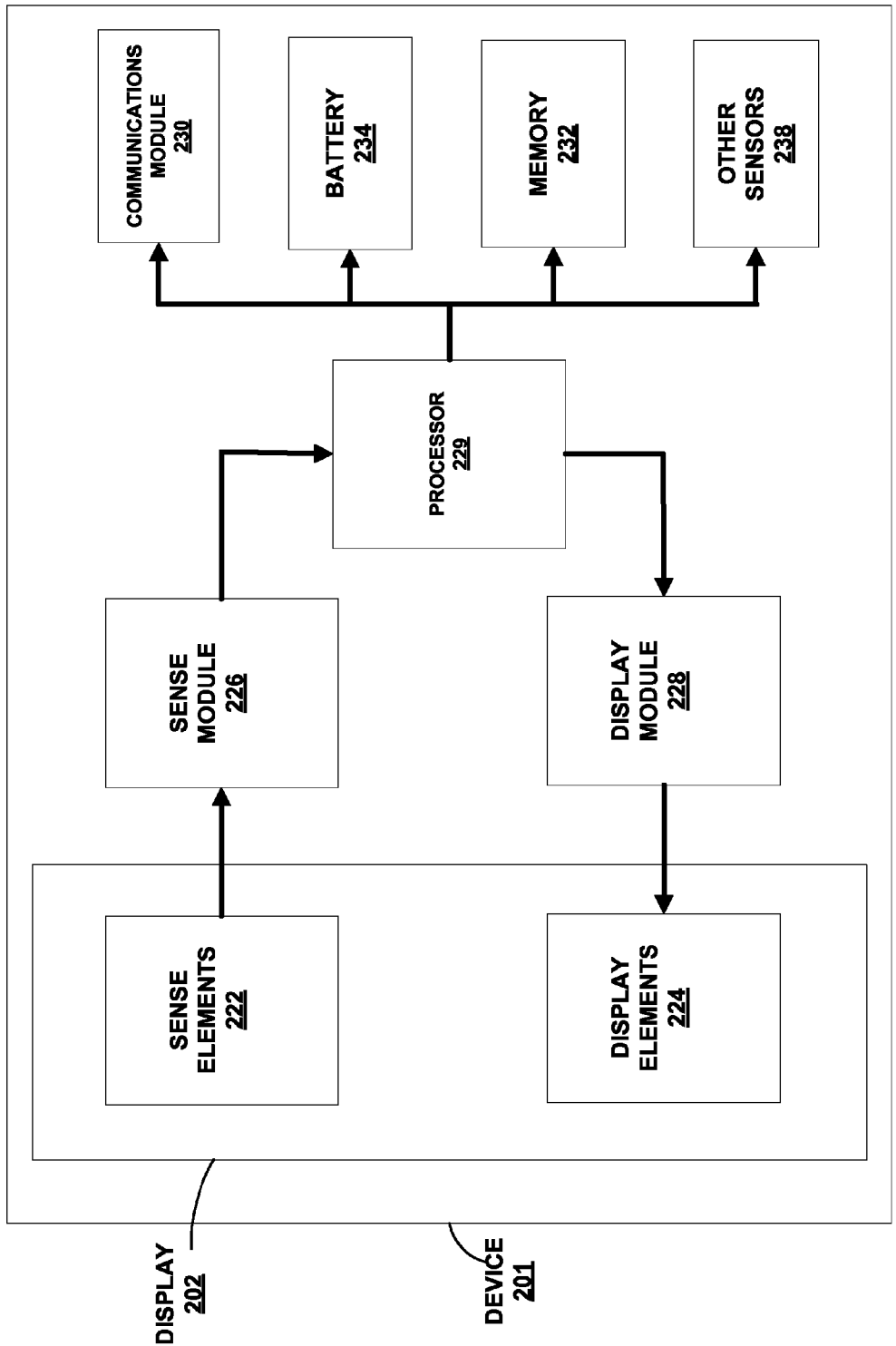
FIG. 2 is a block diagram illustrating an example arrangement of a touch-sensitive device configured to operate consistent with the techniques of this disclosure.

FIG. 2 is a block diagram illustrating one example arrangement of a touch-sensitive device 201 configured to operate consistent with the techniques of this disclosure. As shown in FIG. 2, device 201 includes a display 202. Display 202 is configured to present images to a user. Display 202 is also configured to detect user interaction with display 202, by bringing a finger or stylus in contact with or in proximity to display 202. As also shown in FIG. 2, display 202 includes one or more display elements 224 and one or more sense elements 222. Display elements 224 are presented at or near a surface of display 202 to cause images to be portrayed by display 202. Examples of display elements 224 may include any combination of light emitting diodes (LEDs), organic light emitting diodes (OLED), liquid crystals (liquid crystal (LCD) display panel), plasma cells (plasma display panel), or any other elements configured to present images via a display.

Sense elements 222 may also be presented at or near a surface of display 202. Sense elements 222 are configured to detect when a user has brought a finger or stylus in contact with or proximity to display 202. Examples of sense elements 222 may include any combination of capacitive, resistive, surface acoustic wave, strain gauge, optical imaging, dispersive signal (mechanical energy in glass detection surface that occurs due to touch), acoustic pulse recognition (vibrations caused by touch), or coded LCD (Bidirectional Screen) sense elements, or any other component configured to detect user interaction with a surface of device 201.

Device 201 may further include one or more circuits, software, or the like to interact with sense elements 222 and/or display elements 224 to cause device 201 to display images to a user and to detect user interaction with device 201, including interaction with display 202. For example, device 201 includes display module 228. Display module 228 may communicate signals to display elements 224 to cause images to be presented via display 202. For example, display module 228 may be configured to communicate with display elements 224 to cause the elements to emit light of different colors, at different frequencies, or at different intensities to cause a desired image to be presented via display.

Device 201 further includes sense module 226. Sense module 226 may receive signals indicative of user interaction with display 202 from sense elements 222, and process those signals for use by device 201. For example, sense module 226 may detect when a user has made contact with display 202, and/or when a user has ceased making contact (removed a finger or stylus) with display 202. Sense module 226 may further distinguish between different types of user contact with display 202. For example, sense module 226 may distinguish between a single touch gesture (one finger or one stylus), or a multi-touch gesture (multiple fingers or styli) in contact with display 202 simultaneously. In other examples, sense module 226 may detect a length of time that a user has made contact with display 202. In still other examples, sense module 226 may distinguish between different gestures, such as a single touch gesture, a double or triple (or more) tap gesture, a swipe (moving one or more fingers across display), a circle (lasso) on display, or any other gesture performed via display 202.

In addition, sense module 226 may detect an amount of pressure applied to a surface of device 201, including display 202. In one such example, device 201 may detect a relative amount of surface area of a user's finger in contact with a device 201 surface (e.g., display 202 surface), to determine an amount of pressure or force of a user interaction with device 201. For example, sense module 226 may determine a number of sense elements 222 that detect a particular user interaction with a device 201 surface, because the more pressure or force a user applies, the more surface area is in contact with a user's finger, and therefore the more sense elements 222 will detect user contact with the device 201 surface. In other examples, device 201 may include one or more sense elements 222 configured to directly detect an amount of pressure or force used for a particular user gesture. For example, display 202, or another surface of device 201, may be at least partially compressible in response to user touch. Device 201 may include one or more sense elements 222 configured to detect compression of a device 201 surface. One example of such an at least partially compressible surface is a surface formed of a quantum tunneling composite (QTC) material. In other examples, device 201 may include one or more piezoelectric or other force/pressure sensitive sensors at or near a device 201 surface (e.g., display 202 surface) to detect an amount of pressure of a detected user gesture.

As also shown in FIG. 2, device 201 includes one or more processors 229, one or more communications modules 230, one or more memory devices 232, and one or more batteries 234. Processor 229 may be coupled to sense module 226 to control detection of user interaction with display 202. Processor 229 may further be coupled to display module 228 to control the display of images via display 202. Processor 229 may control the display of images via display 202 based on signals indicative of user interaction with display 202 from sense module 236, for example when a user draws a gesture, that gesture may be reflected on display 202.

Processor 229 may further be coupled to memory 232 and communications module 230. Memory 232 may include one or more of a temporary (e.g., volatile memory) or long term (e.g., non-volatile memory such as a computer hard drive) memory component. Processor 229 may store data used to process signals from sense elements 222, or signals communicated to display elements 224 to control functions of device 201. Processor 229 may further be configured to process other information for operation of device 201, and store data used to process the other information in memory 232.

Processor 229 may further be coupled to communications module 230. Communications module 230 may be a device configured to enable device 201 to communicate with other computing devices. For example, communications module 230 may be a wireless card, Ethernet port, or other form of electrical circuitry that enables device 201 to communicate via a network such as the Internet. Using communications module 230, device 201 may communicate via a cellular network (e.g., a 3G network), a local wireless network (e.g., a Wi-Fi® network), or a wired network (Ethernet network connection). Communications module 230 may further enable other types of communications, such as Bluetooth® communication.

In the example of FIG. 2, device 201 further includes one or more batteries 234. In some examples in which device 201 is a portable device (e.g., cellphone, laptop, smartphone, netbook, tablet computer, etc.), device 201 may include battery 234. In other examples in which device 201 is a non-portable device (e.g., desktop computer, television display), battery 234 may be omitted from device 201. Where included in device 201, battery 234 may power circuitry of device 201 to allow device 201 to operate in accordance with the techniques of this disclosure.

In the example of FIG. 2, device 201 further includes other sensors 238. Other sensors 238 may provide device 201 with an ability to detect forms of user input other than user interaction with device display 202 and/or other surfaces of device 201. For example, other sensors 238 may include one or more accelerometers to detect movement of device, one or more gyroscopes to detect an orientation of device 201, one or more global positioning system (GPS) units to detect a geographical position of device 201, and or other sensors configured to detect user input and/or conditions of device 201.

The example of FIG. 2 shows sense module 226 and display module 228 as separate from processor 229. In some examples, sense module 226 and display module 228 may be implemented in separate circuitry from processor 229 (sense module 236 may be implemented separate from display module 228 as well). However, in other examples, one or more of sense module 226 and sensor module 228 may be implemented via software stored in memory 232 and executable by processor 229 to implement the respective functions of sense module 226 and display module 228. Furthermore, the example of FIG. 2 shows sense element 222 and display elements 224 as formed independently via display 202. However, in some examples, one or more sense elements 222 and display elements 224 may be formed of arrays including multiple sense and display elements, which are interleaved in display 202. In some examples, both sense 222 and display 224 elements may be arranged to cover an entire surface of display 201, such that images may be displayed and user interaction detected across at least a majority of display 202.

FIGS. 3A-3D are conceptual diagrams that illustrate generally one example of a technique for providing a scratch-off style user interface using a touch-sensitive device consistent with the techniques of this disclosure. As shown in FIG. 3, a display (e.g., display 102, 202) of a touch-sensitive device (e.g., device 101, 201) may present a first image 314 and a second image 316. The first image 314 may be overlaid upon the second image 316. At least part of first image 314 may be removable in response to detection of user interaction with the device. Removal of at least part of first image 314 may reveal at least some of second image 316 to a user. Second image 316 may include one or more of user-readable text, a user-selectable icon, a still image or video, a link to a uniform resource locator (URL), an application executable by the device, or a document stored on the device or elsewhere.

Figure 3A:
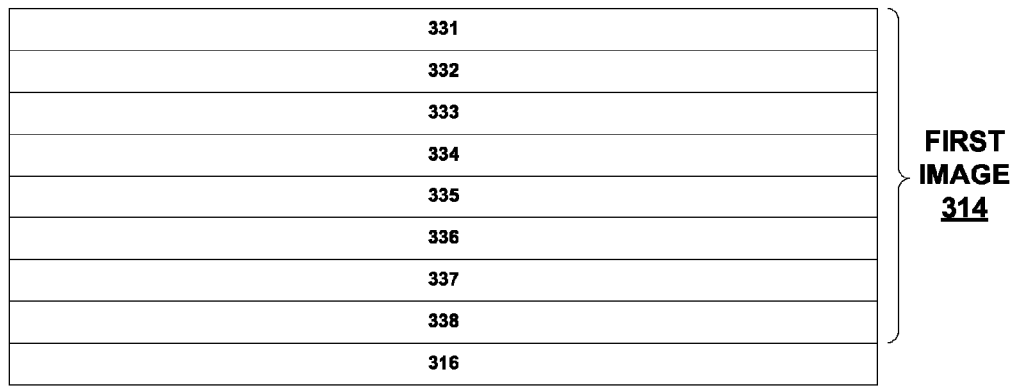
FIG. 3A-3D are conceptual diagrams that illustrate one example of a touch-sensitive device operated consistent with the techniques of this disclosure.

As depicted in the example of FIG. 3A, first image 314 may initially include a plurality of image layers 331-338. The plurality of image layers 331-338 may represent various levels of image thickness that are removable to reveal second image 316. For example, removal of a first layer 331 of first image 314 may reveal a second layer 332 of image 314 and/or a part of second image 316. Removal of all of image layer 331-338 may reveal all of second image 316.

Figure 3B:
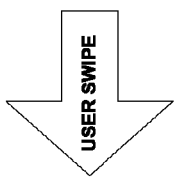
Figure 3B:
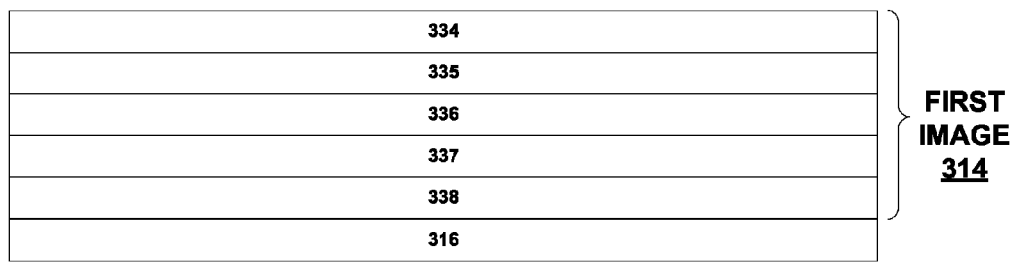
Figure 3C:
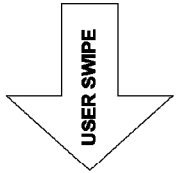
Figure 3C:
Figure 3D:
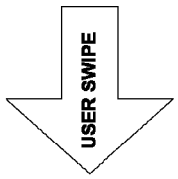
Figure 3D:

The example of FIGS. 3A-3D depicts the respective image layers 331-338 removed according to a step function. As shown in FIG. 3B, detection by the device of a first user interaction with the device (e.g., a user swipe in the FIG. 3 example) may cause the device to remove presentation of a first number of image layers (three image layers 331-333) of first image 314. As shown in FIG. 3C, a second user swipe may cause the device to remove presentation of a second number of image layers (four image layers 334-337) of first image 314 greater than the first number of image layers. If the remaining number of image layers of first image 314 is greater than the second number of image layers (four image layers 334-337), then a third number of image layers greater than the first and second number of image layers may be removed. However, as shown in FIG. 3C, if a smaller number of image layers than the second number of image layers remains, then the remaining image layers (image layer 338) may be removed as shown in FIG. 3D. Removal of image layers 331-338 may entirely reveal second image 316, as also shown in FIG. 3D.

Figure 4A:
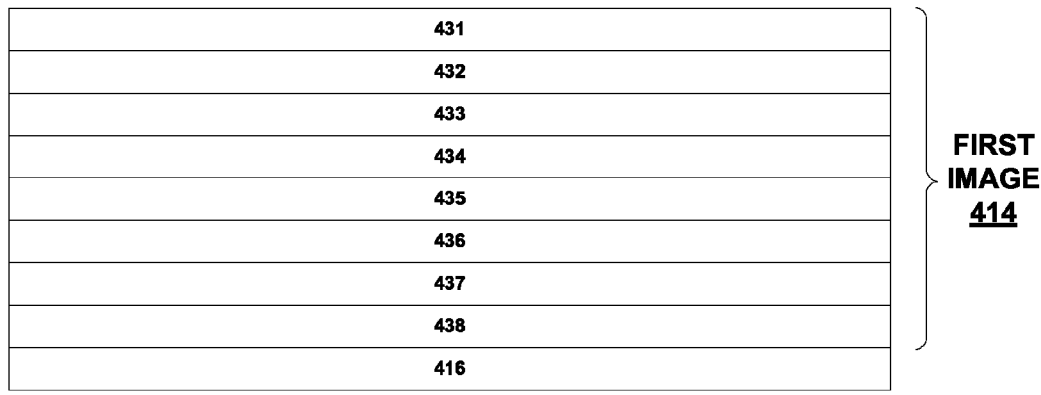
FIG. 4A-4D are conceptual diagrams that illustrate one example of a touch-sensitive operated consistent with the techniques of this disclosure.

FIGS. 4A-4D are conceptual diagrams that illustrate generally one example of a technique for providing a scratch-off style user interface using a touch-sensitive device consistent with the techniques of this disclosure. As shown in FIG. 4A, a display (e.g., display 102, 202) of a touch-sensitive device (e.g., device 101, 201) may be configured to present a first image 414 and a second image 416. The first image 414 may be overlaid upon the second image 416. At least part of first image 414 may be removable in response to detection of user interaction with the device. Removal of at least part of first image 414 may reveal at least some of second image 416 to a user. Second image 316 may include one or more of user-readable text, a user-selectable icon, a still image or video, a link to a uniform resource locator (URL), an application executable by device 101, or a document stored on device 101 or elsewhere.

As depicted in the example of FIG. 4A, first image 414 may initially include a plurality of image layers 431-438. The plurality of image layers 431-438 may represent various levels of image thickness that are removable to reveal second image 416. For example, removal of a first layer 431 of first image 414 may reveal second layer 432 of first image 414 and/or a part of second image 416. Removal of all of image layer 431-438 may reveal all of second image 416.

Figure 4B:
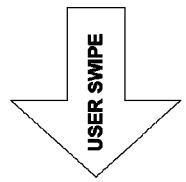
Figure 4B:
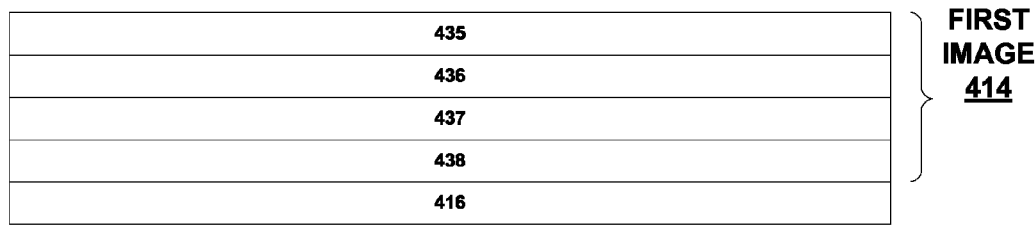
Figure 4C:
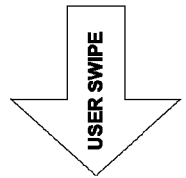
Figure 4C:
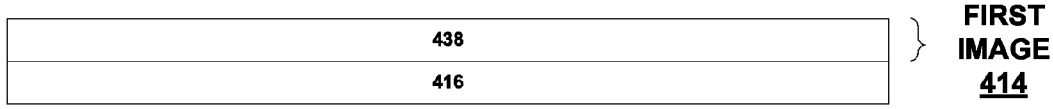
Figure 4D:
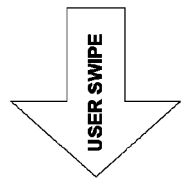
Figure 4D:

The example of FIGS. 4A-4D depicts the respective image layers 431-438 removed according to an inverse step function. As shown in FIG. 4B, detection by the device of a first user interaction with the device (e.g., a user swipe in the FIG. 4 example) may cause the device to remove presentation of a first number of image layers (four image layers 431-434) of first image 414. As shown in FIG. 4C, a second detected user interaction may cause the device to remove presentation of a second number of image layers (three image layers 435-437) of first image 414 less than the first number of image layers. A third detected user interaction may cause the device to remove presentation of a third number of image layer (one image layer 438) of first image 414, as shown in FIG. 4D. Removal of image layers 431-438 may entirely reveal second image 416, as also shown in FIG. 4D.

In other examples not depicted in FIGS. 3A-3D and 4A-4D, device 101 may be configured to remove a number of image layers 331-338, 441-438 based on a relative amount of pressure and/or force detected by device 101 for a user interaction with device 101. For example, device 101 may include one or more sensors, or otherwise be configured, to detect an amount of pressure and/or force of a particular user interaction (e.g., user gesture) as described above with respect to FIG. 2. As such, device 101 may be configured to detect a first pressure or force of a first user interaction with device 101, and correspondingly remove from presentation by display 102 a first number of layers of a first image 314, 316. Device 101 may further detect a second user interaction with device 101 with a second pressure or force different than the first pressure or force. In response to detection of the second user interaction, device 101 may remove from presentation of first image 314, 316 a second number of image layers different than the first number of image layers removed from presentation in response to the first detected user interaction with device 101.

Figure 5A:
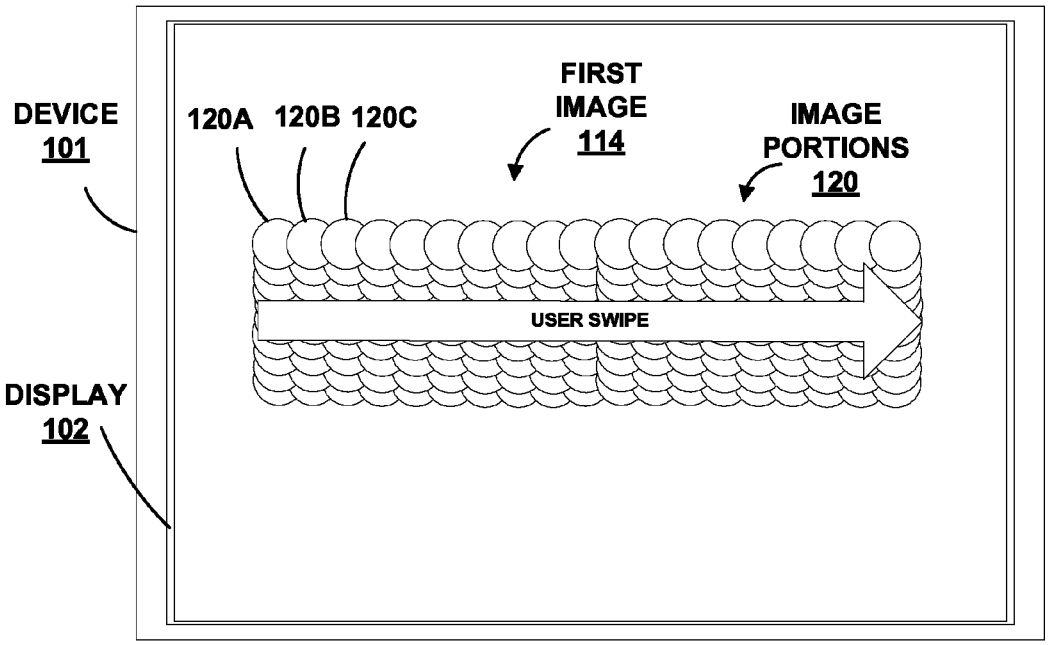
FIG. 5A-5B are conceptual diagrams that illustrate one example of a touch-sensitive device operated consistent with the techniques of this disclosure.
Figure 5B:
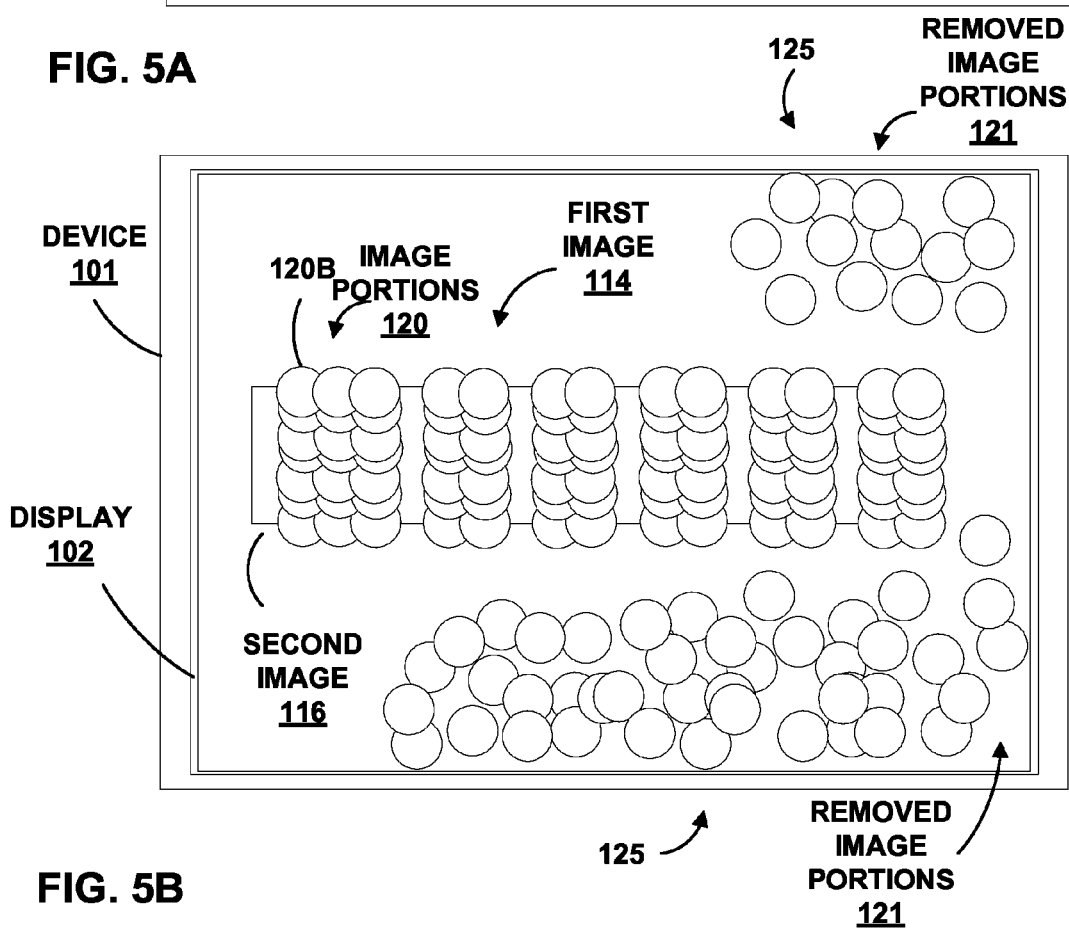

FIGS. 5A and 5B are conceptual diagrams that illustrate generally one example of a technique for providing a scratch-off style user interface using a touch-sensitive device consistent with the techniques of this disclosure. FIG. 5A is similar to FIG. 1A and depicts a first image 114 that includes a plurality of image portions 120. The first image 114 may be removable to reveal at least part of a second image 116 in response to device 101 detection of user interaction with device 101. FIG. 5B illustrates one example of device 101 response to detection of user interaction (e.g., a detected user swipe) with device 101.

As shown in FIG. 5B, instead of device 101 operating to entirely remove from presentation image portions 12 that have been removed from first image 114 in response to device 101 detection of a user interaction, at least some of the removed image portions 121 remain displayed at a different region 125 of display 102 than where first image 114 and/or second image 116 are presented. According to this example, a detected second user interaction with device 101 may cause device 101 to remove image portions 121 removed from first image 114 entirely. The detected second interaction may be device 101 motion and/or a change in orientation of device 101. For example, device 101 may entirely remove presentation of image portions 121 previously removed from first image 114 in response to detection by an accelerometer, gyroscope, or other motion/orientation sensor of device 101 detection that the user has shaken device 101, or that the user has turned device 101 in space. For example, the user may tilt device 101, causing image portions 121 removed from first image 114 to appear to "fall" from display 102 (e.g., "fall" in a downward or other direction on display 102). As another example, a user may shake device 101, and thereby cause image portions removed from first image 114 to appear to dissipate and/or fall from display 102.

Figure 6:
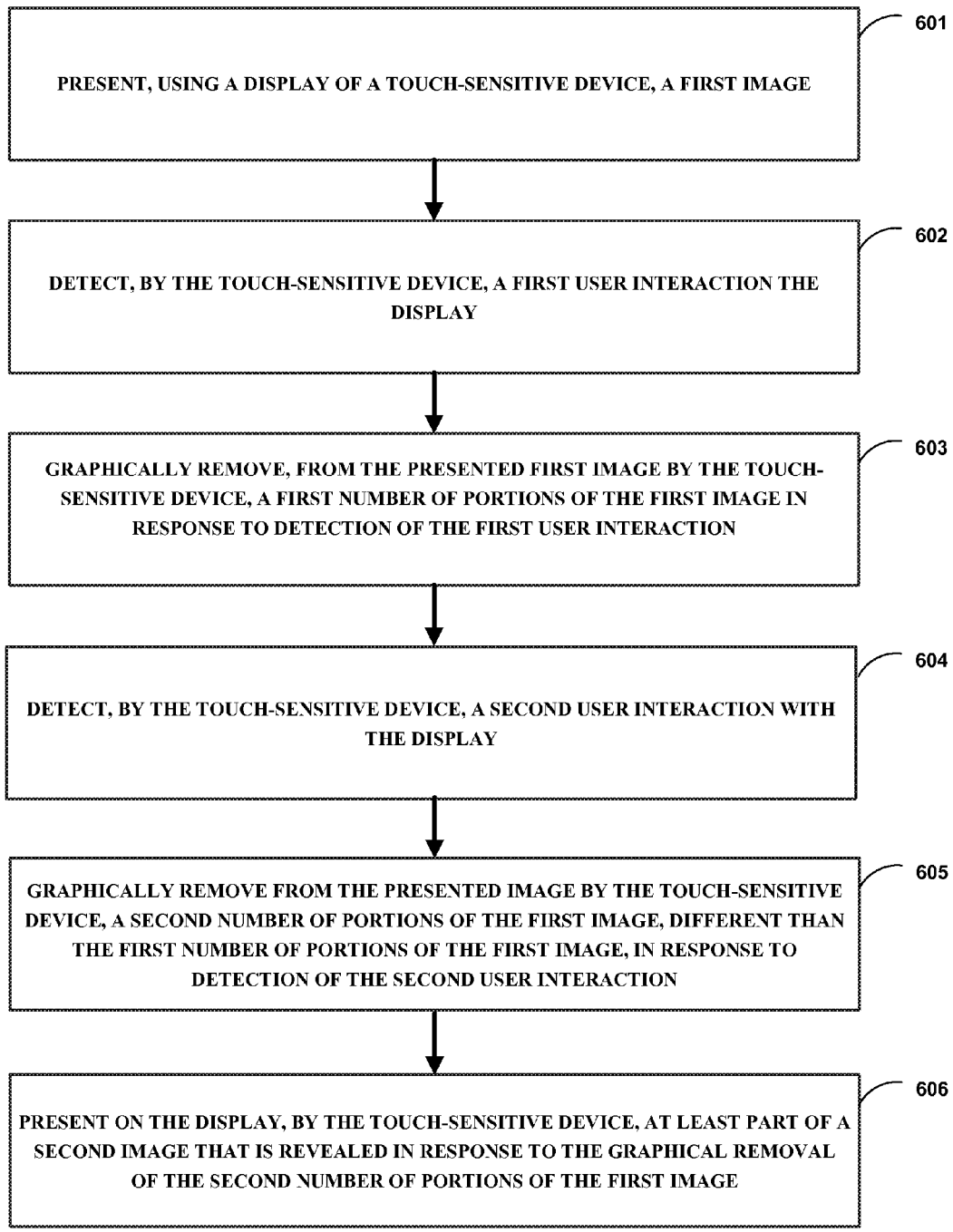
FIG. 6 is a flow chart diagram illustrating one example of a method of operation of a touch-sensitive device consistent with the techniques of this disclosure.

FIG. 6 is a flow chart illustrating one example of a method of operation of a touch-sensitive device consistent with the techniques of this disclosure. The method includes presenting, using a display 102 of a touch-sensitive device 101, a first image 114 (601). The first image includes a plurality of portions. In one example, the plurality of portions are image portions 120 (e.g., "particles") as depicted in FIGS. 1A-1C and FIGS. 5A and 5B. In another example, the plurality of portions are image layers 331-338, 431-438 as depicted in FIGS. 3A-3D and 4A-4D, respectively. The method further includes detecting, by the touch-sensitive device, a first user interaction with the display (602). In one example, detecting the first user interaction includes detecting user interaction with a region of the display where the first image is presented. The method further includes graphically removing, from the presented first image by the touch-sensitive device, a first number of portions of the first image in response to detection of the first user interaction (603). The method further includes detecting, by the touch-sensitive device, a second user interaction with the display (604). In one example, detecting the second user interaction includes detecting user interaction with the region of the display where the first image is presented. The method further includes graphically removing, from the presented image by the touch-sensitive device, a second number of portions of the first image, different than the first number of portions of the first image, in response to detection of the second user interaction (605). The method further includes presenting, using the display, by the touch-sensitive device, at least part of a second image 116 that is revealed in response to the graphical removal of the second number of portions of the first image (606).

Figure 7:
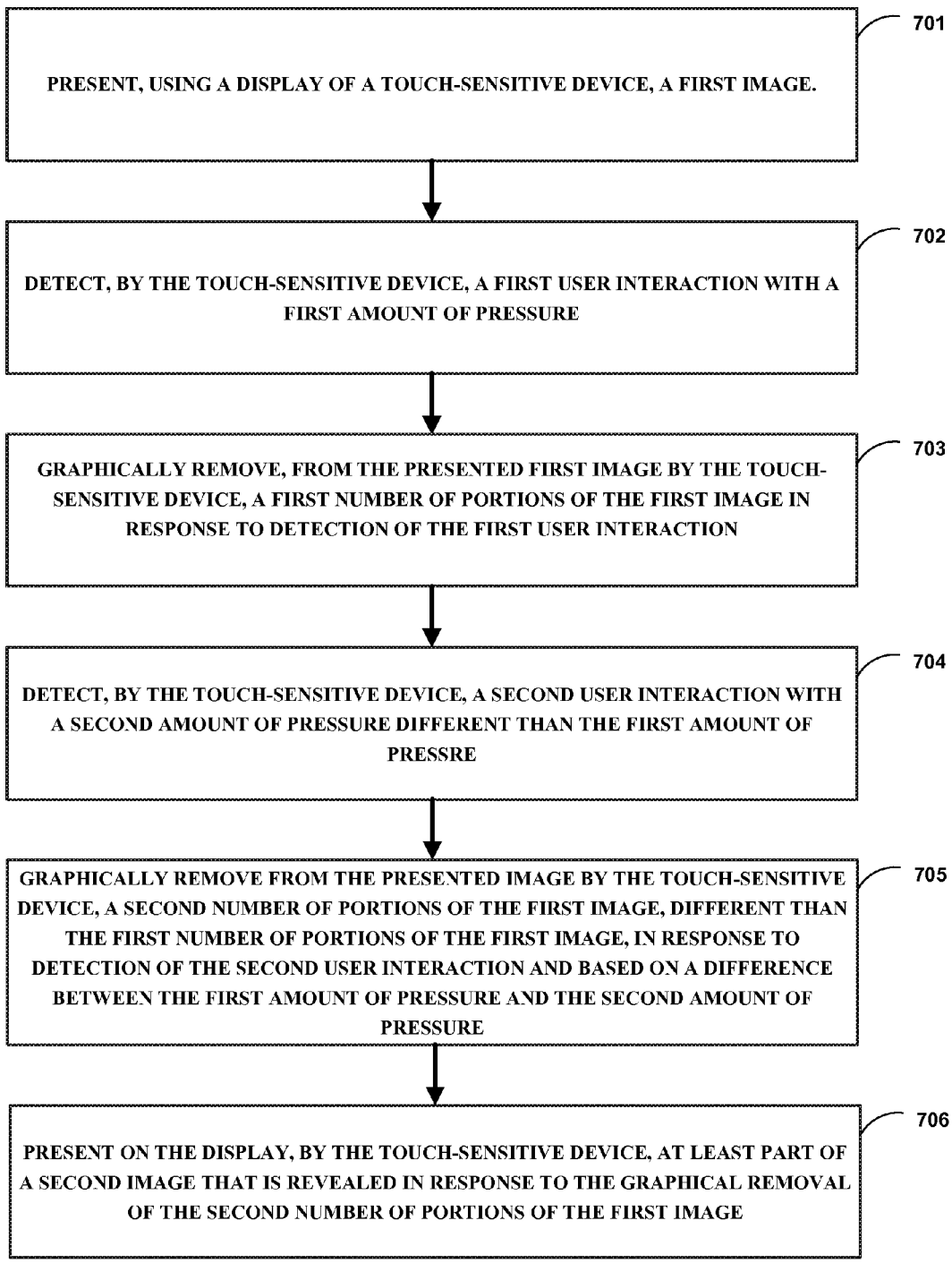
FIG. 7 is a flow chart diagram illustrating one example of a method of operation of a touch-sensitive device consistent with the techniques of this disclosure.

FIG. 7 is a flow chart diagram that illustrates generally a method of operation of a touch-sensitive device consistent with the techniques of this disclosure. As shown in FIG. 7, the method includes presenting, using a display of a touch-sensitive device, a first image (701). The method further includes detecting, by the touch-sensitive device 101, a first user interaction with a first amount of pressure or force (702). The first user interaction may be detected with a display 102 surface of device 101, or other another surface of device. The first user interaction may be detected at or near a region of display 102 presenting the first image. The method further includes graphically removing, from the presented first image by the touch-sensitive device, a first number of portions of the first image in response to detection of the first user interaction (703).

The method further includes detecting, by the touch-sensitive device, a second user interaction with a second amount of pressure different than the first amount of pressure or force (704). The method further include graphically removing, from the presented first image by the touch-sensitive device, a second number of portions of the first image, different than the first number of portions of the first image, in response to detection of the second user interaction and based on a difference between the first amount of pressure and the second amount of pressure (705). The first and second portions of the first image may be image portions (e.g., image portions 120 as depicted in FIGS. 1A-1C). The first and second portions of the first image may instead be image layers 331-338, 431-448 as depicted in FIGS. 3A-3D and 4A-4D. In one example, where the second user interaction with device 101 is detected with a greater pressure or force than the first user interaction, the touch-sensitive device may graphically remove presentation of more portions of the first image than the touch-sensitive device graphically removed from presentation in response to the first user interaction. In another example, where the second user interaction with device 101 is detected with a lesser pressure or force than the first user interaction, the touch-sensitive device may graphically remove presentation of less portions of the first image than the touch-sensitive device graphically removed from presentation in response to the first user interaction.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in a computer-readable medium, such as a computer-readable storage medium, containing instructions. Instructions embedded or encoded in a computer-readable medium, including a computer-readable storage medium, may cause one or more programmable processors, or other processors, to implement one or more of the techniques described herein, such as when instructions included or encoded in the computer-readable medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may comprise one or more computer-readable storage media.

Various embodiments of the disclosure have been described. These and other embodiments are within the scope of the following claims.

The invention claimed is:

1. An article of manufacture comprising a computer-readable storage medium that stores instructions that, when executed, cause a computing device to:
   output, for display, a first image;
   receive an indication of a first user interaction with a touch-sensitive input device, the first user interaction indicating a first plurality of portions of the first image, wherein a greater pressure or contact area associated with the first user interaction with the touch-sensitive input device indicates a respectively greater number of the first plurality of portions of the first image;
   responsive to receiving the indication of the first user interaction, remove the first plurality of portions of the first image, such that the first plurality of portions are entirely removed from display in the first image;
   receive an indication of a second user interaction with the touch-sensitive input device, the second user interaction indicating a second plurality of portions of the first image, the second plurality of portions of the first image being different than the first plurality of portions of the first image, wherein a greater pressure or contact area associated with the second user interaction with the touch-sensitive input device indicates a respectively greater number of the second portions of the first image;
   responsive to receiving the indication of the second user interaction, remove the second plurality of portions of the first image, such that the second plurality of portions are entirely removed from display in the first image;
   output, for display, a second image comprising an animated image or video that is revealed in response to removal of the first plurality of portions and second plurality of portions of the first image, thereby providing a simulated scratch-off user interface;
   receive an indication of a third user interaction with the touch-sensitive input device, the third user interaction indicating a third plurality of portions of the first image and at least a portion of the second image; and
   responsive to receiving the indication of the third user interaction:
      remove the third plurality of portions of the first image, such that the third plurality of portions are entirely removed from display in the first image; and
      output, for display, an enlarged portion of the second image, the enlarged portion including at least the portion of the second image and at least one additional portion of the second image different from at least the portion of the second image.

2. The article of manufacture of claim 1, wherein the first plurality of portions of the first image and the second plurality of portions of the first image comprise a plurality of layers of the first image.

3. The article of manufacture of claim 1, wherein the first plurality of portions of the first image and the second plurality of portions of the first image comprise a plurality of graphically stacked layers of the first image.

4. The article of manufacture of claim 1, wherein the first plurality of portions of the first image and the second plurality of portions of the first image comprise a plurality of overlapping particles of the first image.

5. The article of manufacture of claim 1, wherein the instructions further cause the computing device to:
   detect a first pressure associated with the first user interaction; and
   detect a second pressure associated with the second user interaction,
   wherein the detected first pressure causes the first plurality of portions of the first image to be removed from presentation in the first image, and
   wherein the detected second pressure causes the second plurality of portions of the first image to be removed from presentation in the first image.

6. The article of manufacture of claim 1, wherein the first plurality of portions is greater than the second plurality of portions.

7. The article of manufacture of claim 1, wherein the first plurality of portions is less than the second plurality of portions.

8. A method, comprising:
   displaying, by a computing device and for display, a first image;
   receiving, by the computing device, an indication of a first user interaction with a touch-sensitive input device, the first user interaction indicating a first plurality of portions of the first image, wherein a greater pressure or contact area associated with the first user interaction with the touch-sensitive input device indicates a respectively greater number of the first plurality of portions of the first image;

responsive to receiving the indication of the first user interaction, removing, by the computing device, the first plurality of portions of the first image such that the first plurality of portions are entirely removed from display in the first image;

receiving, by the computing device, an indication of a second user interaction with the touch-sensitive input device, the second user interaction indicating a second plurality of portions of the first image, the second plurality of portions of the first image being different than the first plurality of portions of the first image, the second plurality of portions of the first image different than the first plurality of portions of the first image, wherein a greater pressure or contact area associated with the second user interaction with the touch-sensitive input device indicates a respectively greater number of the second portions of the first image;

responsive to receiving the indication of the second user interaction, removing, by the computing device, the second plurality of portions of the first image, such that the second plurality of portions being entirely removed from display in the first image;

outputting, by the computing device and for display, a second image comprising an animated image or video that is revealed for display to a user in response to the removal of the first plurality of portions and second plurality of portions of the first image, thereby providing a simulated scratch-off user interface;

receiving, by the computing device, an indication of a third user interaction with the touch-sensitive input device, the third user interaction indicating a third plurality of portions of the first image and at least a portion of the second image; and responsive to receiving the indication of the third user interaction:
 removing, by the computing device, the third plurality of portions of the first image, such that the third plurality of portions are entirely removed from display in the first image; and
 outputting, by the computing device and for display, an enlarged portion of the second image, the enlarged portion including at least the portion of the second image and at least one additional portion of the second image different from at least the portion of the second image.

9. A computing device, comprising:
a memory; and
one or more programmable processors configured to:
output, for display, a first image;
receive an indication of a first user interaction with a touch-sensitive input device, the first user interaction indicating a first plurality of portions of the first image, wherein a greater pressure or contact area associated with the first user interaction with the touch-sensitive input device indicates a respectively greater number of the first plurality of portions of the first image; and
responsive to receiving the indication of the first user interaction, remove the first plurality of portions of the first image from the displayed first image such that the first plurality of portions are entirely removed from display in the first image;

receive an indication of a second user interaction with the touch-sensitive input device, the second user interaction indicating a second plurality of portions of the first image, the second plurality of portions of the first image different being than the first plurality of portions of the first image, the second plurality of portions of the first image different than the first plurality of portions of the first image, wherein a greater pressure or contact area associated with the second user interaction with the touch-sensitive input device indicates a respectively greater number of the second portions of the first image;

responsive to receiving the indication of the second user interaction, remove the first plurality of portions from the displayed first image, is further configured for removing second plurality of portions of the first image from the first image, such that the second plurality of portions of the first image are entirely removed from display in the first image;

output, for display, a second image comprising an animated image or video revealed in response to removal of the first plurality of portions and second plurality of portions of the first image, thereby providing a simulated scratch-off user interface;

receive an indication of a third user interaction with the touch-sensitive input device, the third user interaction indicating a third plurality of portions of the first image and at least a portion of the second image; and responsive to receiving the indication of the third user interaction:
 remove the third plurality of portions of the first image, such that the third plurality of portions are entirely removed from display in the first image; and
 output, for display, an enlarged portion of the second image, the enlarged portion including at least the portion of the second image and at least one additional portion of the second image different from at least the portion of the second image.

10. The article of manufacture of claim 1, wherein the instructions further cause the computing device to:
output, for display, at least a portion of one or both of the first plurality of portions of the first image and the second plurality of portions of the first image, such that at least the portion of one or both of the first plurality of portions and the second plurality of portions of the first image does not overlap with the second image.

11. The article of manufacture of claim 10, wherein the instructions that cause the computing device to output, for display, at least the portion of one or both of the first plurality of portions and the second plurality of portions of the first image comprise instructions that cause the computing device to:
output, for display, at least the portion of one or both of the first plurality of portions and the second plurality of portions of the first image as a removed portion of the first image, thereby providing the simulated scratch-off user interface.

12. The method of claim 8, further comprising:
outputting, by the computing device and for display, at least a portion of one or both of the first plurality of portions of the first image and the second plurality of portions of the first image, such that the displayed portion of one or both of the first plurality and the second plurality does not overlap with the second image.

13. The method of claim 12, wherein outputting, by the computing device and for display, at least the portion of one or both of the first plurality and the second plurality comprises:

outputting, by the computing device and for display, at least the portion of one or both of the first plurality and the second plurality, such that the displayed portion of one or both of the first plurality and the second plurality is displayed as a removed portion of the first image, thereby providing the simulated scratch-off user interface.

14. The computing device of claim 9, wherein the one or more programmable processors are further configured to:

output, for display, at least a portion of one or both of the first plurality of portions of the first image and the second plurality of portions of the first image, such that the displayed portion of one or both of the first plurality and the second plurality does not overlap with the second image.

15. The computing device of claim 14, wherein, to output, for display, at least the portion of one or both of the first plurality and the second plurality, the one or more programmable processors are configured to:

output, for display, at least the portion of one or both of the first plurality and the second plurality, such that the displayed portion of one or both of the first plurality and the second plurality is displayed as a removed portion of the first image, thereby providing the simulated scratch-off user interface.

* * * * *